FREQUENCY SELECTING SIGNAL TRANSLATION SYSTEM
UTILIZING A PASSIVE VOLTAGE NETWORK AND
AN ACTIVE REGENERATIVE AMPLIFIER

Filed Nov. 12, 1963 2 Sheets-Sheet 1

WITNESSES
Leon J. Laza
James F. Young

INVENTORS
Robert Bento, Irving F. Barditch
and Charles G. Brooks
BY
ATTORNEY

United States Patent Office 3,333,207

Patented July 25, 1967

3,333,207

FREQUENCY SELECTING SIGNAL TRANSLATION SYSTEM UTILIZING A PASSIVE VOLTAGE NETWORK AND AN ACTIVE REGENERATIVE AMPLIFIER

Robert Bento, Tiverton, R.I., and Irving F. Barditch and Charles G. Brooks, Baltimore, Md., assignors to Westinghouse Electric Corporation, Pittsburgh, Pa., a corporation of Pennsylvania Filed Nov. 12, 1963, Ser. No. 322,999

2 Claims. (Cl. 330—38)

This invention relates to a novel and improved signal translation system. The invention may take more than one form but is particularly adapted to molecularization, that is, capable of being completely fabricated in a single monolithic semiconductor block.

The primary object of the invention is to provide a novel and improved signal translation system comprising a passive network having a voltage gain greater than unity for a selected frequency band in operative association with an active amplifier network.

A further object is to provide a novel and improved signal translation system that can be used either as an amplifier or an oscillator and can be changed from acting as one to acting as the other by a mere adjustment of the regenerative feedback.

A more specific object is to provide a novel and improved oscillator or bandpass amplifier which does not require inductive impedances and therefore can be fabricated in a single monolithic semiconductor block.

The above objects are obtained by so proportioning, in cascaded sections of a passive network, the resistance and capacitance so that the combined phase shift and attenuation per section results in superimposing the voltage vectors at certain frequencies on top of each other so that a voltage gain greater than unity can be obtained even though the device is passive. This will be readily apparent when kept in mind that as a practical matter all signals are made up of a spectrum of frequencies rather than a single frequency. Therefore it is more accurate to consider the signal power from the power spectrum standpoint rather than from the standpoint of a single frequency. The signal energy is not confined to any single frequency but actually is distributed over a band of frequencies as well as over several cycles of each frequency. Therefore, it will readily be understood that if the amplitudes be added vectorially it is possible, even in a passive device, to have a voltage gain greater than one.

The distinction between voltage gain and power gain should be kept in mind in order to understand the significance and novelty of the present invention. This voltage gain that can be obtained in a passive device by phase shifts and vector summation through the passive network is at the expense of input current. Therefore, by combining with such a passive network a device that can properly associate current gain with the voltage gain of the passive network a system having a power gain for a selected frequency band can be provided.

In the broadest sense, the present invention provides a signal translation system comprising a passive distributed RC frequency sensitive network in operative association with an active amplifier network which operates on the signal power spectrum to give the effect of a step-up voltage transformer action thereby providing a net power gain over a selected frequency band. Such a system readily lends itself to operation as a band pass signal amplifier or as an oscillator.

In accordance with the present invention, a power gain amplifier having a high input impedance, a relatively low output impedance, a power gain in the neighborhood of unity or greater and preferably a substantially linear relation between voltage input and current output is fed from a voltage gain passive network which has a voltage gain greater than unity. For carrying out the basic objects of the present invention, the current, or power, amplifier could be an emitter follower. It will be apparent, of course, that the latter could be fabricated into the same monolithic block with the distributed resistance network. Then depending upon the relative amounts of the passive network voltage gain, amplifier power gain and voltage attenuation, the system will exhibit frequency sensitivity, the system being responsive to amplify a narrow band of frequencies fed in from an external source, or to operate as an oscillator when the regenerative feedback from the output is so adjusted as to overcome the losses in the system.

In the illustrated embodiment of the present invention, there is provided a semiconductor device in the form of a p-n junction into which the incoming signal is fed capacitively through a region of the p-n junction of one type of conductivity to an infinite number of points on the other region of opposite semiconductivity, which constitutes a distributed resistor, in such a manner that appropriate phase shift and vector summation of certain frequencies takes place to obtain the voltage gain. Then by incorporating into the same monolithic block a power amplifier which is capable of providing a power and/or current gain which overcomes the losses in the voltage gain network, a band pass power gain system is provided in a single semiconductor monolithic block.

The distributed resistance-capacitance which can be inherently built into a semiconductor device provides a substantially infinite number of R-C sections which are cascaded. Also the distributed capacitance of such a semiconductor device can be readily changed by adjusting the back bias on a p-n junction to vary the capacity and thereby vary the pass band.

The invention itself, however, both as to its organization and method of operation as well as additional objects and advantages will best be understood from the following description when read in connection with the accompanying drawing, in which.

Figure 3:
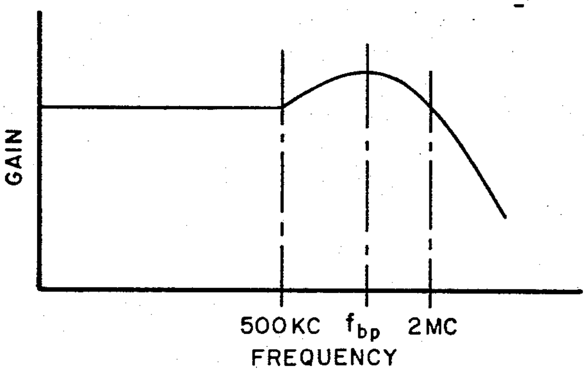
FIG. 3 is a graphical representation of the voltage gain for the passive network of FIG. 2.
Figure 4:
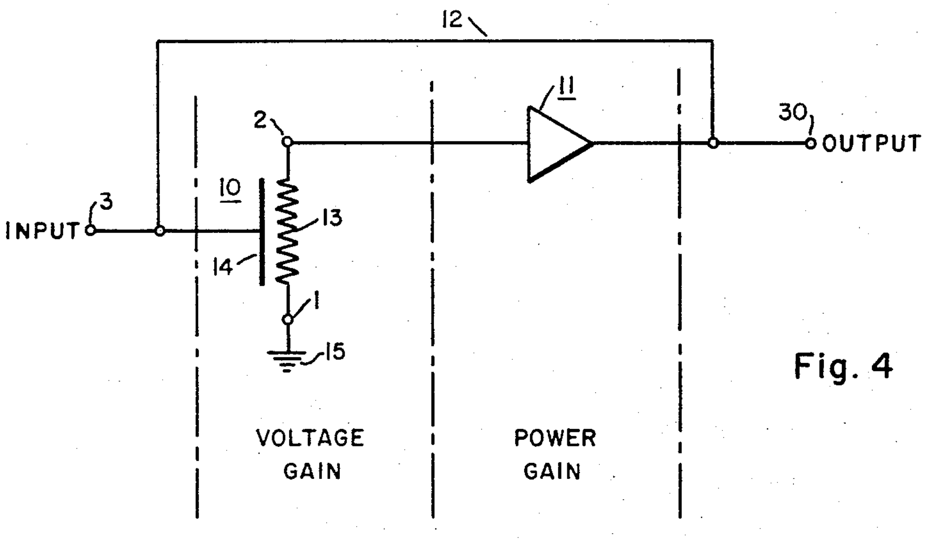
FIG. 4 is a schematic block diagram analysis of the present invention.

Very briefly, the present invention resides in the combination of the basic components analytically illustrated in FIG. 4. These components are a passive distributed R-C voltage gain network 10 and an active power gain network, or current amplifier device 11. The voltage gain network 10 receives the incoming signal, and through phase shifting and attenuation, effectively produces a regenerative feedback within the network 10 itself for a finite frequency spectrum, such as that illustrated in FIG. 3, by superimposing and vectorially adding certain voltage vectors of the finite spectrum so that more than unity gain is obtained for frequencies in this finite spectrum. The input signal is fed into the high impedance capacitive components of the passive network 10. The vectorially added voltage vectors of the finite frequency spectrum output from the network 10 is supplied to the current, or power, amplifier 11. Since the amplifier 11 is chosen to have a substantially linear characteristic, a power output is obtained which is substantially a linear function of the amplitude of the frequencies of the selected pass band of the voltage-gain network 10.

Figure 5:
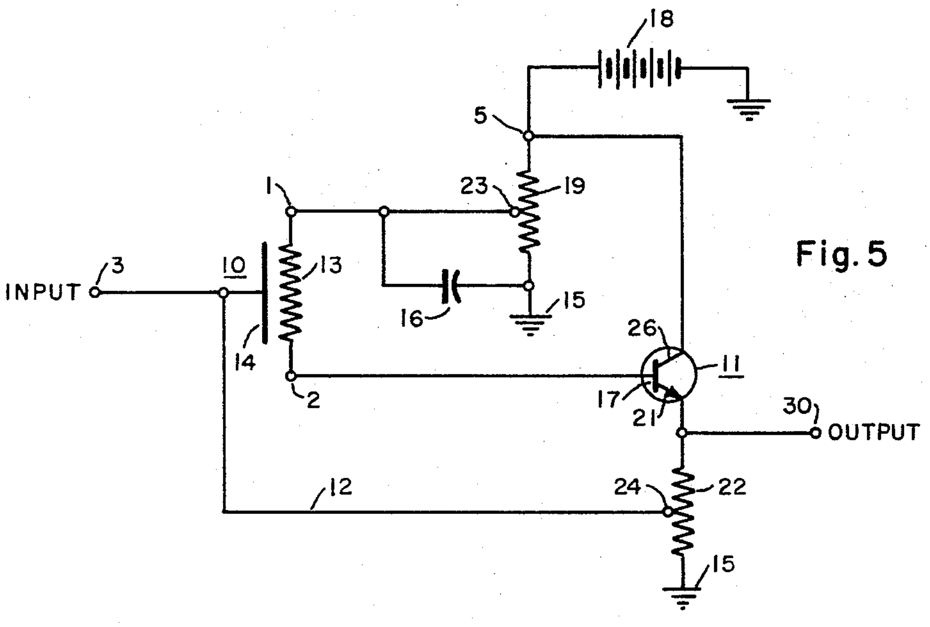
FIG. 5 is a complete circuit diagram of an illustrative embodiment of the present invention.

When referring to the voltage gain of the network 10, reference is made to the gain as determined by the ratio of the input signals, across the input terminals 3 and 1 it being at ground potential, to the output signals, across terminals 2 and 15. In all instances terminal 1 is at ground potential and serves as a common input-output terminal. Although it is known in the prior art that passive R-C networks giving a voltage gain greater than unity for a finite bandwidth can be made using lumped parameters, it is preferred in accordance with the present invention to provide a semiconductor distributed R-C passive network built into the same monolithic semiconductor block with a transistor type amplifier, the circuit configuration of which is illustrated in FIG. 5. However, it is within the contemplated scope of this invention that any passive network having a voltage gain greater than unity be operatively associated with any appropriate active amplifier network to accomplish the desired ends taught herein.

Figure 1:
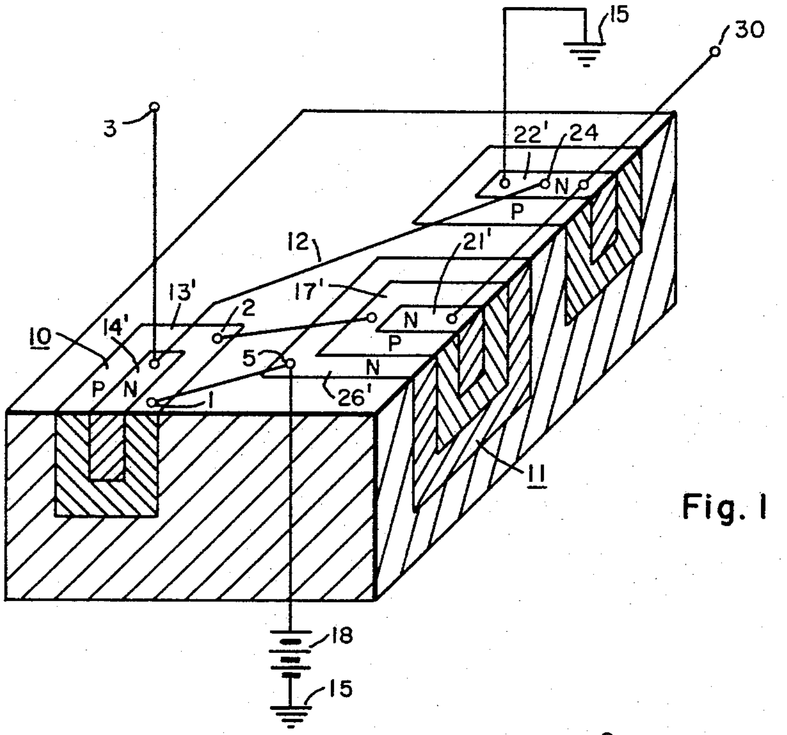
FIGURE 1 is a semiconductor monolithic block illustrating a molecularized version of the present invention.
Figure 2:
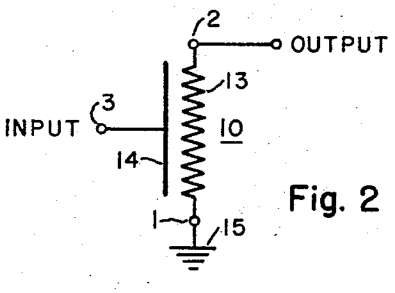
FIG. 2 is a schematic representation of the distributed resistance and capacitance of a passive filter network having a voltage gain greater than one for a finite frequency spectrum.

In FIG. 5 the basic components 10 and 11, analytically illustrated in FIG. 4, are incorporated into a circuit configuration which can be readily fabricated in a single monolithic semiconductor block. The correlated semiconductor physical components and parameters of FIG. 5 are illustrated in FIG. 1 and are represented by corresponding primed reference characters.

It is to be understood that the monolithic device would be fabricated in accordance with known techniques to provide the circuit configuration of FIG. 5.

The configuration is set up to provide a feedback loop including the connection 12 from the output of the amplifier 11 to the input of the passive network 10. The monolithic fabrication of such a network would include a large p-n junction, carrying the contact terminals 1 and 2 on a p-type semiconductor region 13 and the single contact terminal 3 on an n-type region 14. Referring to FIG. 5, it is to be noted that, for A.C. signals, terminal 1 is at ground potential by reason of the coupling capacitor 16 connected between the contact lead 1 and the common input-output terminal ground 15. Terminal connection 2, that is, the non-common output terminal of the passive network 10 is connected to the base 17 of the semiconductor transistor configuration which constitutes the current or power amplifier 11.

In the configuration shown as an example the p-type region 13 constituting the distributed resistor component of the network 10 is in the series circuit including a source of potential 18, a 10 K potential divider resistor 19, the base electrode 17, the emitter electrode 21 and an emitter resistor 22 and the ground 15. A terminal 23 on the resistor 19, the position of which is selected in relation to the source of potential 18 for adjusting the bias across the base-emitter junction. A terminal 24 on the potential divider resistor 22 is positioned for adjusting the feedback on connection 12 from the emitter follower resistor 22 to the input terminal 3. The collector 26 of the transistor configuration is connected to the positive side of the battery 18. The output for the signal translation system of the present invention is provided between the emitter 21 through the terminal 30 and ground 15.

In accordance with conventional practice in the art of monolithic fabrication, the resistors are in the form of semiconductor regions and the terminals are in the form of ohmic contacts.

It is to be noted that since the power amplifier 11 is operated as an emitter follower, the output signals on the connection 12 will be in phase with the signals appearing at the input terminal 3 so that regenerative feedback takes place. It is readily apparent to those skilled in the art that by adjusting the position of the terminal 24 on the resistor so that the feedback is just less than the losses in the system, the latter will operate as a band pass amplifier. The center of the band pass will be at the frequency $f_{bp}$, indicated in FIG. 3, which is at the frequency of peak gain for the passive network 10. It will also be apparent that if the terminal 24 is adjusted to give feedback above the threshold value, that is, so that the feedback from the power 11 amplifier to the input terminal 3 is greater than the losses in the system the device will operate as an oscillator, with the center frequency being the same as indicated above.

The term "power amplifier" should be interpreted to include any amplifier wherein there is a current gain. Those skilled in the art will realize that it is not necessary that the amplifier, or active network have a gain greater than unity in order to provide the band pass characteristic; since the power gain is the product of the voltage and the current, it is the relative values of the voltage of the passive network and the current gain of the active network that are the determining factor.

Although but one form of the invention is illustrated, it will readily be apparent to those skilled in the art that various modifications and departures can be made from the illustrated embodiment without departing from the spirit of the invention. For example, although the illustrative embodiment of the invention is in the form of a semiconductor device having distributed resistance and capacitance in combination with a transistor type amplifier, it will be apparent to those skilled in the art that lumped parameters in the passive network may be used either with a transistor type amplifier or with other appropriate types of amplifiers.

We claim as our invention:

1. As a new article of manufacture, a semiconductive device in a monolithic block constituting a passive distributed R-C network having a bandpass voltage gain characteristic greater than unity, said device comprising a first semiconductor region of one type of semiconductivity and a second semiconductor region of opposite semiconductivity type, said regions being joined in contiguous relation to form a p-n junction, said contiguous regions of said junction forming a distributed capacitance and the first of said regions forming the distributed resistance of said passive network, an active amplifier connected to said passive network comprising a semiconductor configuration having its base connected to one end of said first region, the other end of said first region being connected to A.C. ground, biasing means connected to said first semiconductor region for biasing the base of said amplifier, said amplifier being connected as an emitter follower and having a resistor in the emitter circuit across which a voltage drop is developed and means connected from the output circuit of said emitter-follower to said second semiconductor region to produce zero phase regenerative feedback.

2. A signal translation system comprising a p-n junction device constituting a passive distributed R-C network and having a bandpass voltage gain characteristic greater than unity, said device comprising a first semiconductor region of a first semiconductivity type and a second semiconductor region of opposite semiconductivity type said regions being joined in contiguous relation to form a p-n junction constituting a distributed R-C network, the first of said regions forming the distributed resistance of said network, transistor amplifier means having its base connected to one end of said first region constituting the distributed resistance, the other end of said first region being connected to A.C. ground, biasing means connected to said latter semiconductor region for biasing the base of said amplifier, said amplifier being connected as an emitter-follower and having a resistor in the emitter circuit across which a voltage drop is developed and means connected from the output circuit of said emitter-follower circuit to said second semiconductor region to provide zero phase regenerative feedback in said system.

(References on following page)

References Cited

UNITED STATES PATENTS

| | | | |
|---|---|---|---|
| 2,816,228 | 12/1957 | Johnson | 330—38 X |
| 3,107,331 | 10/1963 | Barditch et al. | |
| 3,148,344 | 9/1964 | Kaufman. | |

OTHER REFERENCES

Army Technical Manual: TM 11–690, March 1959, U.S. Government Printing Office, Washington, D.C., pp. 108–111 relied on.

Hager: Network Design of Microcircuits, Electronics, Sept. 4, 1959, pp. 44–49.

Kaufman: Theory of a Monolithic Null Device and Some Novel Circuits, Proc. of IRE, September 1960, vol. 48, pp. 1540–1545.

ROY LAKE, *Primary Examiner.*

NATHAN KAUFMAN, *Examiner.*

F. D. PARIS, *Assistant Examiner.*